(12) United States Patent
Hung

(10) Patent No.: US 9,448,374 B2
(45) Date of Patent: Sep. 20, 2016

(54) OPTICAL COMMUNICATION APPARATUS HAVING COUPLER AND SUPPORTING MEMBER CONNECTED TOGETHER

(71) Applicant: HON HAI PRECISION INDUSTRY CO., LTD., New Taipei (TW)

(72) Inventor: Yi Hung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 125 days.

(21) Appl. No.: 14/253,974

(22) Filed: Apr. 16, 2014

(65) Prior Publication Data
US 2014/0312214 A1 Oct. 23, 2014

(30) Foreign Application Priority Data

Apr. 23, 2013 (TW) .............................. 102114298 A

(51) Int. Cl.
G02B 6/42 (2006.01)
(52) U.S. Cl.
CPC .............. *G02B 6/425* (2013.01); *G02B 6/4214* (2013.01)

(58) Field of Classification Search
CPC .......... G02B 6/32; G02B 6/36; G02B 6/4206
USPC ............... 385/24, 33, 53, 88, 89, 92, 93, 94; 250/578.1
See application file for complete search history.

(56) References Cited

U.S. PATENT DOCUMENTS

| 7,331,014 B2* | 2/2008 | Relyea .................. G06F 9/4443 715/713 |
| 2002/0034363 A1* | 3/2002 | Wickman ............. G02B 6/4249 385/88 |
| 2013/0208510 A1* | 8/2013 | Takashima .............. G09F 13/04 362/615 |

* cited by examiner

*Primary Examiner* — Renee Chavez
(74) *Attorney, Agent, or Firm* — Zhigang Ma

(57) ABSTRACT

Optical communication apparatus includes a PCB, a photoelectric unit electrically connected to the PCB, a supporting member positioned on the PCB, a coupler supported on the supporting member, and an optical fiber unit. The coupler optically couples the photoelectric unit to the optical fiber unit. The supporting member defines a through stepped hole having a larger first hole and a smaller second hole. The supporting member includes a step portion between the first hole and the second hole. The second hole is closer to the PCB than the first hole. One of the supporting member and the coupler defines a plurality of wedged positioning holes, the other of the supporting member and the coupler comprises a plurality of wedged positioning poles corresponding to positioning holes, and the coupler is connected to the supporting member by inserting the positioning poles into the corresponding positioning holes.

14 Claims, 5 Drawing Sheets

OPTICAL COMMUNICATION APPARATUS HAVING COUPLER AND SUPPORTING MEMBER CONNECTED TOGETHER

FIELD

The present disclosure relates to an optical communication apparatus.

BACKGROUND

Optical communication apparatuses include a coupler and a photoelectric unit. The coupler optically couples an optical fiber unit to the photoelectrical unit. To ensure an optical transmission efficiency of the optical communication apparatus, the coupler should be accurately aligned with the photoelectric unit.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
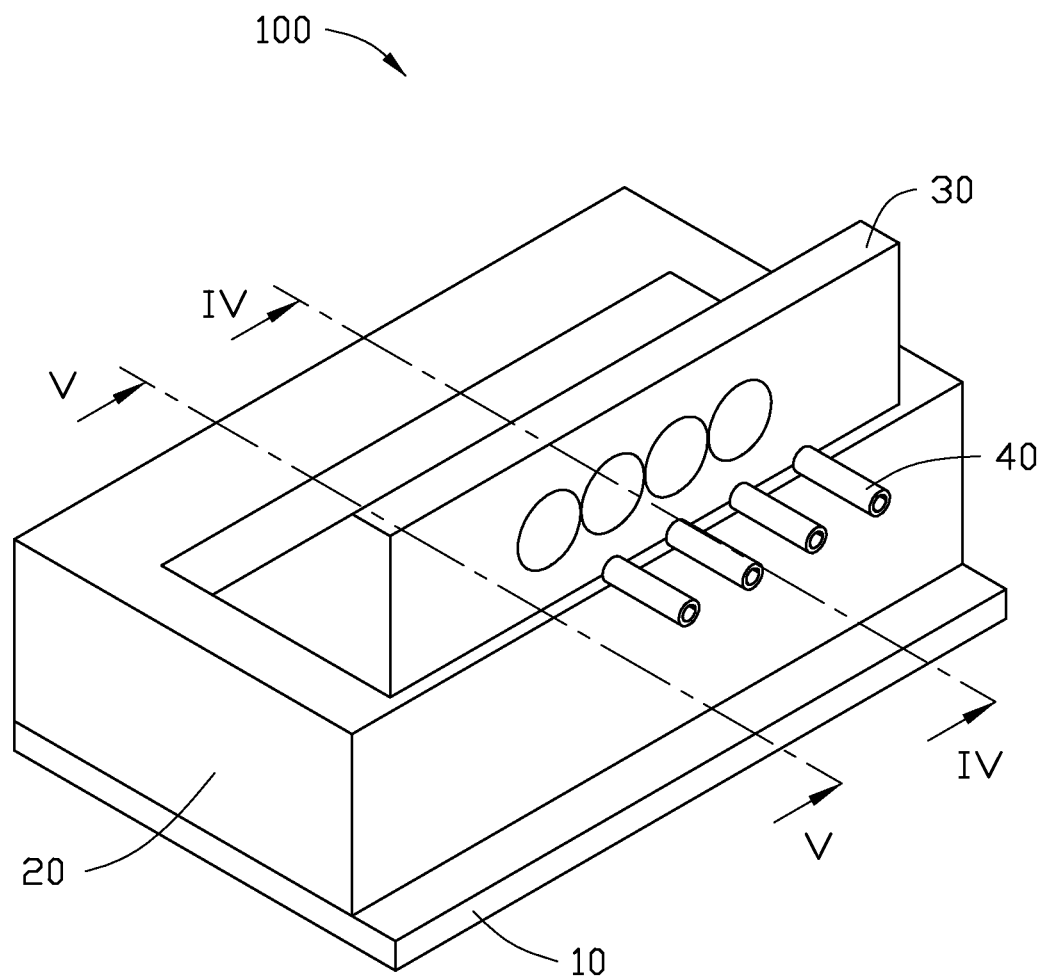
FIG. 1 is an isometric view of an optical communication apparatus, according to an exemplary embodiment of the present disclosure.
Figure 2:
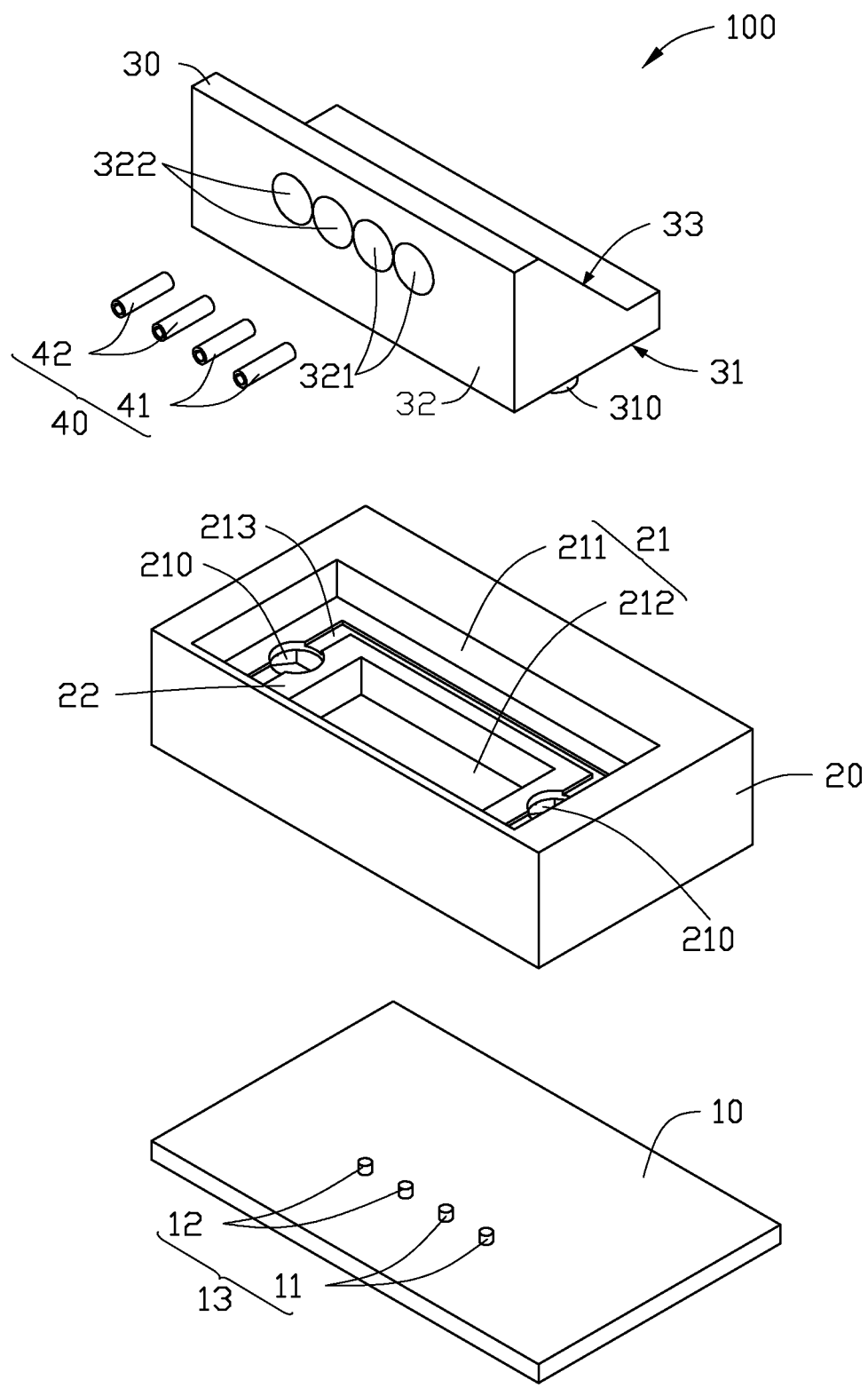
FIG. 2 is an exploded isometric view of the optical communication apparatus of FIG. 1.
Figure 3:
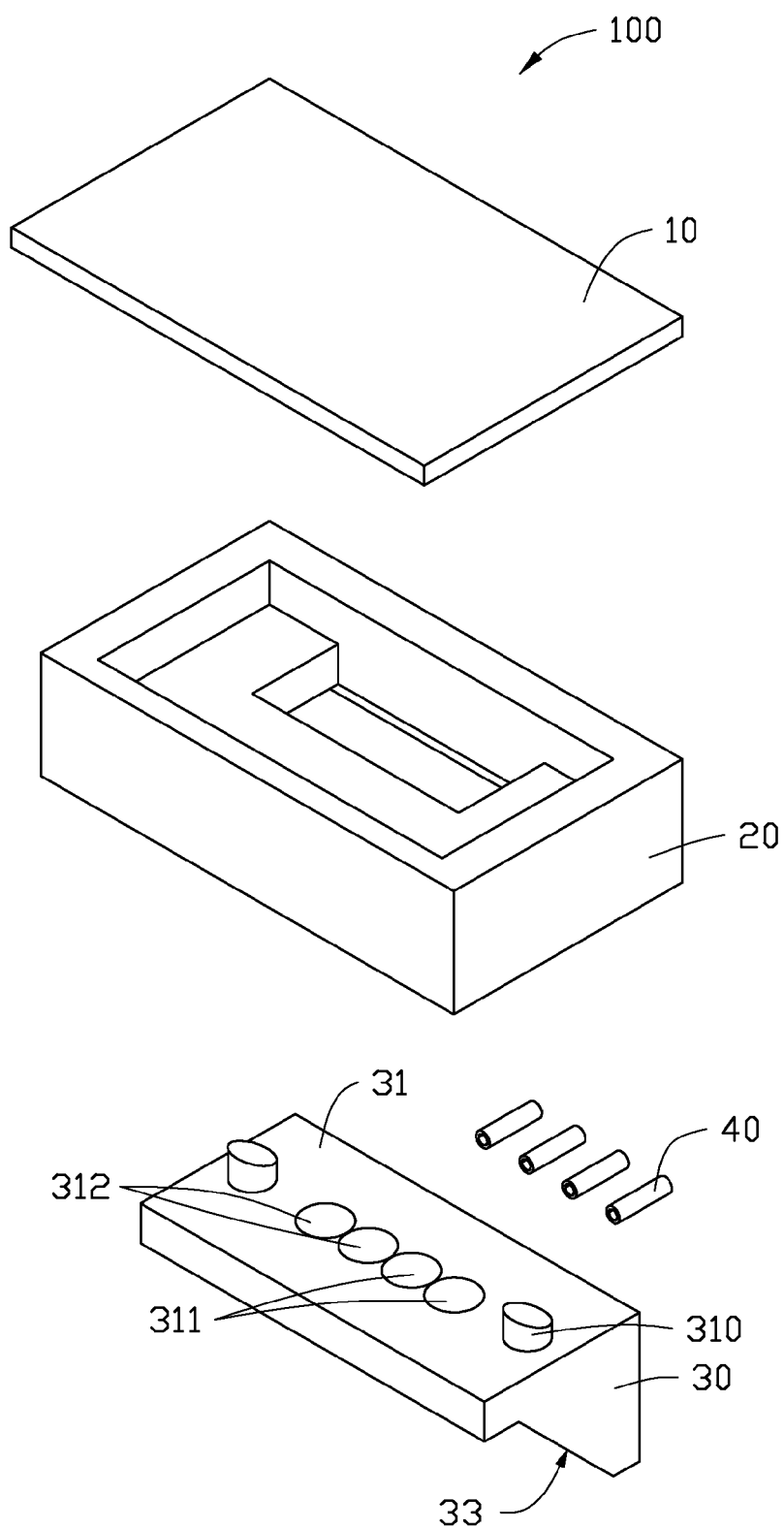
FIG. 3 is similar to FIG. 2, but shown the optical communication apparatus from another angle.
Figure 4:
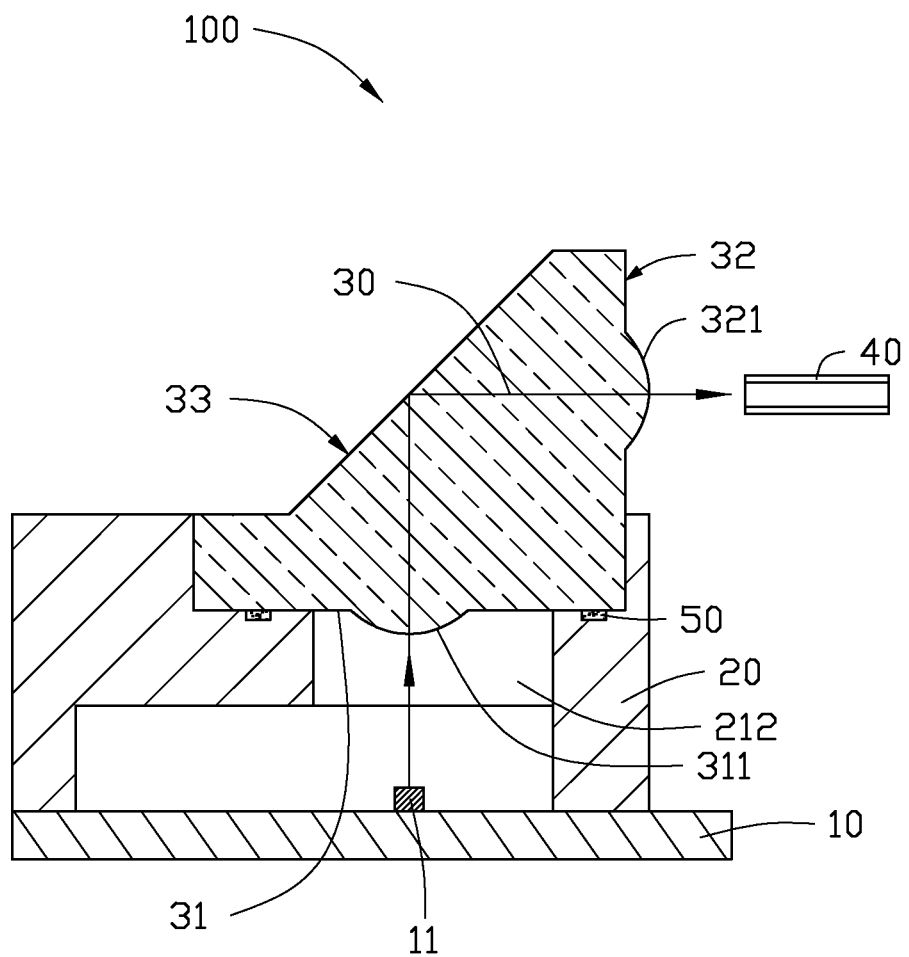
FIG. 4 is a cross sectional view of the optical communication apparatus of FIG. 1, taken along line IV-IV.
Figure 5:
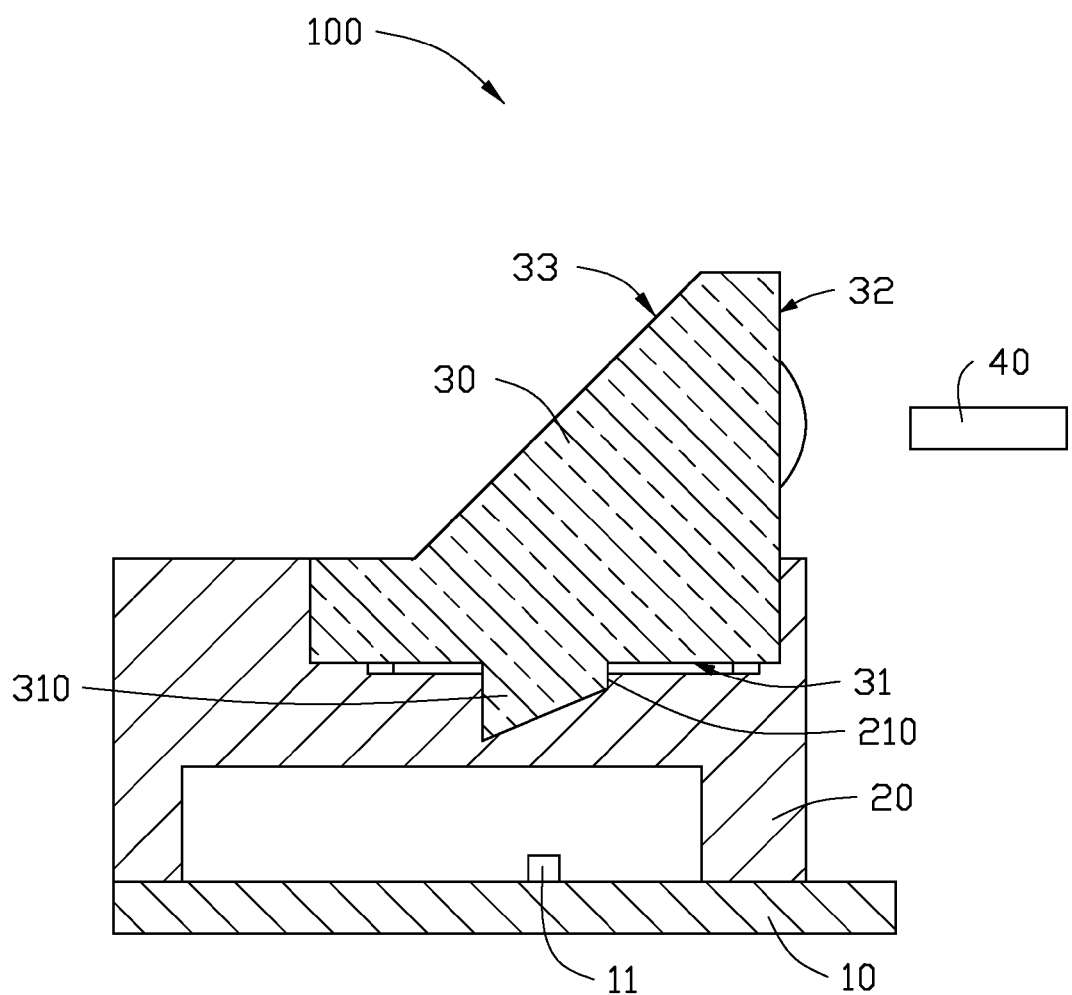
FIG. 5 is a cross sectional view of the optical communication apparatus of FIG. 1. Taken alone line V-V.

FIGS. 1-4 show one embodiment of an optical communication apparatus 100. The optical communication apparatus 100 includes a printed circuit board (PCB) 10, a photoelectric unit 13, a supporting member 20, a coupler 30, and an optical fiber unit 40. The photoelectric unit 13 and the supporting member 20 are fixedly positioned on the PCB 10, and the coupler 30 is connected to the supporting member 20 covering the photoelectric unit 13.

The PCB 10 can be a flexible PCB (FPCB), a rigid PCB or a rigid-flex compound PCB.

The photoelectric unit 13 includes two emitters 11 for emitting optical signals and two receivers 12 for receiving optical signals. The emitters 11 and the receivers 12 can be electrically connected to the PCB 10. In this embodiment, the emitters 11 can be a light emitting diodes (LEDs) or laser diodes, and the receivers 12 can be photodiodes. In this embodiment, the emitters 11 and the receivers 12 are arranged along a linear direction.

The supporting member 20 is substantially rectangular-shaped. The supporting member 20 defines a stepped hole 21. The stepped hole 21 includes first hole 211 and a second hole 212 communicating with the first hole 211. A size of the first hole 211 is larger the second hole 212, thereby the supporting member 20 forms a step portion 22 between the first hole 211 and the second hole 212. The supporting member 20 defines two positioning holes 210 and a groove 213 in a surface of the step portion 22. A bottom portion each positioning hole 210 is wedged. Therefore, a bottom surface of the positioning hole 210 is inclined for a predetermined angle relative to the surface of the step portion 22. In this embodiment, a sharp angle between the bottom surface of the positioning hole 210 and the surface of the step portion 22 is about 20 degrees. The groove 213 is communicating with the positioning holes 210. The groove 213 is configured for containing an adhesive 50 (see in FIG. 4). In this embodiment, the groove 213 surrounds the second hole 213 to form a loop.

The coupler 30 is made of a transparent material. The coupler 30 includes a first surface 31, a second surface 32 facing the supporting member 20, and a third surface 33. The first surface 31 is substantially perpendicular to the second surface.

An angle between the first surface 31 and the third surface 33 is substantial 45 degrees, and an angle between the second surface 32 and the third surface 33 is substantial 45 degrees.

The coupler 30 includes two positioning poles 310 corresponding to the positioning holes 210, two first lenses 311 corresponding to the emitters 11, and two second lenses 312 corresponding to the receivers 12. The positioning poles 310, the first and second lenses 311, 312 are formed on the first surface 31. Each positioning pole 310 has an adaptive shape and size with a corresponding positioning hole 210. A distal end of each positioning pole 310 is wedged, thereby forming a sharp portion on the distal end. The first lenses 311 and the second lenses 312 are convex lenses. An optical axis of each of the first lenses 311 and second lenses 312 is substantially perpendicular to the first surface.

The coupler 30 includes two third lenses 321 corresponding to the first lenses 311 and two fourth lenses 322 corresponding to the second lenses 312. The third lenses 321 and fourth lenses 322 are formed on the second surface 32. An optical axis of the each of the third lenses 321 and fourth lenses 322 is substantially perpendicular to the second surface 32.

The optical fiber unit 40 includes two output optical fibers 41 corresponding to the emitters 11 and two input optical fibers 42 corresponding to the receivers 12. The output optical fibers 41 output optical signals emitted by the emitters 11 and the input optical fibers 42 input optical signals to the receivers 12.

In assembly, the photoelectric unit 13 is electrically connected to the PCB 10. The supporting member 20 is fixedly positioned on the PCB 10. The second hole 212 is closer to the PCB 10 than the first hole 211. The photoelectric unit 13 is exposed in the stepped hole 21.

An adhesive 50 is filled in the groove 213. The coupler 30 is connected to the supporting member 20, and an end of the coupler 30 with the first surface 31 is engaged into the first hole 211. The positioning poles 310 are inserted into the corresponding the positioning holes 210, and an distal end surface of each positioning pole 310 is attached on the bottom surface of a corresponding positioning hole 210. In addition, the first surface 31 is supported on the step portion 22 and is adhered to the step portion 22 by the adhesive 50. The first lenses 311 are respectively aligned with the emitters 11, and the second lenses 312 are respectively aligned with the receivers 12. The output optical fibers 41 are respectively aligned with the third lenses 321, and the input optical fibers 42 are respectively aligned with the fourth lenses 322. In operation, the emitters 11 emit optical signals to the coupler 20. The optical signals pass through the first lenses 311 and project on the third surface 33. The third surface 33 reflects the optical signals to the third lenses 321, and the optical signals emit from of the coupler 20 through the third lenses 321 and enter into the output optical fibers 40. The receiver 12 can receive optical signals transmitted from the input optical fiber 42 by passing along a path similar but converse to a path of the optical signals emitted by the emitter 12.

In this embodiment, the positioning poles 310 are formed on the coupler 30. The positioning holes 210 are defined in the supporting member 20. Alternatively, the coupler 30 can define a number of positioning holes, and the supporting member 20 may include a number of positioning poles.

The number of emitters 11, receivers 12, and the corresponding optical fibers 41, 42 can be changed according to different requirements, thus the number of the first lenses 311, the second lenses 312, the third lenses 321, and the fourth lenses 322 can be accordingly changed.

The coupler 30 and the supporting member 20 are connected to each other via an engagement between the positioning holes 210 and the positioning poles 310, respectively aligning the first lenses 311 and the second lens 312 with the emitters 11 and the receiver 12. Because of the wedged shapes of the distal ends of the positioning poles 310 and the bottom portions of the positioning hole 310, it is easy to assemble the coupler 30 to a proper assembling position relative to the support member 20. Therefore, that ensures an easy and precise assembly between the coupler 30 and the photoelectric unit 13.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the disclosure.

What is claimed is:

1. An optical communication apparatus, comprising:
   a PCB;
   a photoelectric unit electrically connected to the PCB;
   a supporting member fixedly positioned the PCB, the supporting member defining a through stepped hole comprising a larger first hole and a smaller second hole, the supporting member comprising a step portion between the first hole and the second hole, the second hole being closer to the PCB than the first hole, the photoelectric unit being exposed in the stepped hole;
   a coupler engaged into the first hole and supported on the step portion; and
   an optical fiber unit, the optical fiber unit and the photoelectrical unit being optically coupled to each other by the coupler;
   wherein the supporting member defines a plurality of positioning holes, the positioning holes are located at two opposite ends of the second hole, the coupler comprises:
      a plurality of positioning poles corresponding to positioning holes,
      a bottom portion of each positioning hole is wedged,
      a distal end of each positioning pole is wedged corresponding to the bottom portion of a corresponding positioning hole, the distal end is inclined to the step portion of the coupler, the coupler is connected to the supporting member by inserting the positioning poles into the corresponding positioning holes, and
   the wedged distal ends of the positioning poles are respectively engaged with the
   wedged bottom portions of the positioning holes.

2. The optical communication apparatus of claim 1, wherein the photoelectric unit comprises a plurality of emitters for emitting optical signals and a plurality of receivers for receiving optical signals.

3. The optical communication apparatus of claim 2, wherein the emitters and the receivers are arranged along a linear direction.

4. The optical communication apparatus of claim 2, wherein the emitters are laser diodes, and the receivers are a photodiodes.

5. The optical communication apparatus of claim 2, wherein the coupler comprises a first surface facing toward the PCB, a second surface, and a third surface, the third surface is configured for reflecting optical signals between the first surface and the second surface.

6. The optical communication apparatus of claim 2, wherein the coupler comprises a plurality of first lenses corresponding to the emitters and a plurality of second lenses corresponding to the receivers, the first lenses and the second lenses are formed on the first surface.

7. The optical communication apparatus of claim 6, wherein an optical axis of each of the first lenses and the second lenses is perpendicular to the first surface.

8. The optical communication apparatus of claim 6, wherein the coupler comprises a plurality of third lenses corresponding to the first lenses and a plurality of fourth lenses corresponding to the second lenses, the third lenses and the fourth lenses are formed on the second surface.

9. The optical communication apparatus of claim 8, wherein an optical axis of the each of the third lenses and fourth lenses is perpendicular to the second surface.

10. The optical communication apparatus of claim 1, wherein the PCB is selected from one of a group consisting of a flexible PCB, a rigid PCB, and a rigid-flex compound PCB.

11. The optical communication apparatus of claim 1, wherein the positioning holes are defined in a surface of the step portion, and the positioning poles are formed on a surface of the coupler facing toward the PCB.

12. The optical communication apparatus of claim 1, wherein the supporting member defines a groove in the step portion, the groove is configured for containing an adhesive for adhering the coupler to supporting member.

13. The optical communication apparatus of claim 12, wherein the groove extends surrounding the second hole.

14. The optical communication apparatus of claim 12, wherein the groove extends across the positioning holes.

* * * * *